United States Patent [19]
McAlister

[11] Patent Number: 5,580,086
[45] Date of Patent: Dec. 3, 1996

[54] CRASH PROTECTION METHOD AND APPARATUS

[76] Inventor: Roy E. McAlister, 216 S. Clark MS 103, Tempe, Ariz. 85281

[21] Appl. No.: 447,108

[22] Filed: May 22, 1995

[51] Int. Cl.$^6$ .................................................. B60R 21/32
[52] U.S. Cl. .................................... 280/737; 200/741
[58] Field of Search ................................. 280/737, 734, 280/741

[56] References Cited

U.S. PATENT DOCUMENTS 5,330,730  7/1994  Brede et al. ........................ 280/737
5,351,988  10/1994  Bishop et al. ...................... 280/737
5,429,387  7/1995  Clark et al. ....................... 280/737

Primary Examiner—Kenneth R. Rice

[57] ABSTRACT

An air bag protection system 1 which produces fuel by electrolysis and ignites the fuel to heat gases for purposes of rapidly inflating reticulated bag 16 into a crash arrest barrier. Coatings are provided for prolonging the deployed life of the protective bag against thermal degradation due to external exposure to fires and internal heating by inflation gases.

12 Claims, 2 Drawing Sheets

CRASH PROTECTION METHOD AND APPARATUS

This invention relates to an improved method and apparatus for inflatable crash protection systems.

BACKGROUND OF THE INVENTION

There is about one motor vehicle for every eleven persons on Earth. More than 400 million cars and trucks are operated throughout the world. Aircraft, automobiles and boats are operated at speeds that impart considerable kinetic energy to passengers. Injury to passengers results if this kinetic energy is not dissipated gradually. Each year more people are killed or injured in motor vehicle accidents than were killed or injured in the Vietnam or Korean wars. Motor vehicles involved in collisions need better protection for passengers. Air bags have shown positive results in protecting crash victims. Air bags presently used for crash protection of passengers produce numerous problems and are inadequate in several ways including:

1. Solid propellants such as azide compounds used to inflate air bags produce objectional emissions and residues.
2. Solid propellant systems are dangerous in the manufacturing plants that produce them and have caused many accidents.
3. Chemicals and manufacturing processes used in the production of solid propellants produce environmentally objectionable residues that pose disposal problems.
4. Ignition systems for conventional air bag propellant systems are uncertain and produce objectionable byproducts.
5. Common problems of hydrocarbon and ammonia-based gaseous and liquid-state or "fluid" fuels that have been used for air bags include toxicity before combustion and the production of toxic products upon combustion or chemical reaction.
6. Fluid fuel must be mixed with an oxidant and delivered in ignitable proportions in the spark gap of a spark source at the exact time needed to initiate combustion. This is difficult because of varying degrees of fuel penetration and deflection as a result of widely varying velocities of air entry into the geometry of the fuel spray pattern.
7. Fluid fuel directed towards the spark source from the fuel injector for purposes of producing a suitable mixture of fuel and oxidant for spark ignition invariably result in substantial amounts of fuel impinging on heat-robbing areas of the enclosure defined by the air bag components around the spark source. This results in quenching of the combustion and/or heat degradation to air bag components and often seriously compromises the integrity of the air bag by under-inflation, misshaped bags because of shriveling, and/or rupture and leakage upon impact by the crash victim.
8. Previous attempts to use fluid fuels failed to be dependable because of gradual leakage of fuel from storage during prolonged stand-by conditions that are typical to transportation applications.
9. Degradation of adequate rapid-pressurization capabilities has been a problem in previous air-bag inflation systems due to undetected gradual leakage and/or slow reaction of mixtures of fuel and oxidant during prolonged storage.
10. Accidental deployment of air bags due to erroneously initiated reactions between fuel and oxidant mixtures poses a serious hazard to occupants of vehicles equipped with prior-art systems that store mixtures of fuel and oxidant.
11. Present air bag systems are incapable of meeting needs for small, medium, and large air bag inflation requirements without overheating or over pressurization of small bags in a system that is adequate for inflation of large bags.
12. Efforts to overcome the problems arising from undesirable fuel-air ratios at the spark source during the critically short duty cycle required for air bag inflation have resulted in expensive and complicated gadgetry and electronic control systems.

The use of hydrogen as fuel in air bag inflation systems offers attractive characteristics, particularly including the fact that hydrogen is not poisonous, rapid combustion, and virtually no pollutive emissions. However little success has resulted from efforts to provide practical solutions for reducing the problem of thermal degradation of the air bag around the spark source. Another problem has been incomplete combustion due to quenching in instances that sufficient heat sinking by metal plates, split phase materials, and liquid coolants are provided to prevent such thermal degradation.

SUMMARY OF THE INVENTION

An object of the present invention is to overcome the problems noted above. In accordance with the principles of the present invention, this objective is accomplished by providing a process for operating a combustion process to dependably produce products of combustion that rapidly fill and inflate an air bag.

An object of the present invention is to inflate a crash safety bag by a process which comprises the steps of injecting a fluid fuel into an oxidant to produce a mixture of fuel and oxidant at a zone that is traversed by a spark plasma to cause ignition.

An object of the present invention is to store and inflate a crash safety bag by a process which comprises the steps of injecting a fluid fuel into an oxidant to produce a mixture of fuel and oxidant at a zone that provides a catalyst to cause chemical reaction.

An object of the present invention is to inflate a crash safety bag by a process which comprises the steps of injecting a fluid fuel into an oxidant to produce a mixture of fuel and oxidant at a zone that provides a high temperature to cause ignition.

Another object of the present invention is the provision of a process for operating a combustion process comprising the steps of initiating a heat-yielding reaction with air and a fuel that contains hydrogen, exchanging a portion of the heat produced to endothermically react a carbon containing substance with a reagent containing hydrogen and oxygen to produce substantial quantities of a mixture of carbon dioxide and hydrogen, injecting the mixture directly into the combustion zone of an air-bag inflation system substantially at a time that a vehicle crash occurs.

An object of the present invention is to detect propellant depletion and to use electricity to produce hydrogen from a solution containing water for use as an inflation gas to deploy an air bag.

An object of the present invention is to detect propellant depletion and to use an active metal to produce hydrogen from a solution containing water for use as an inflation gas to deploy an air bag.

An object of the present invention is to detect depletion of propellants by leakage or slow reactions and to provide a safety warning or safety interlock to prevent vehicle use without capable air bag deployment systems.

An object of the present invention is to provide capabilities for readily meeting requirements for small, medium and large air bag inflation.

An object of the present invention is to safely store and regulate the delivery of fluid fuels and oxidants such as hydrogen and air on board a vehicle.

An object of the present invention is to store an oxidant donor in an air bag and to release an oxidant from this donor by endothermic reactions that protect the air bag from thermal degradation.

These and other objects of the present invention will become more apparent during the course of the following detailed description and appended claims.

My invention may be best understood with reference to the accompanying drawings, wherein an illustrative embodiment is shown.

DESCRIPTION OF THE PREFERRED EMBODIMENTS

Figure 1:
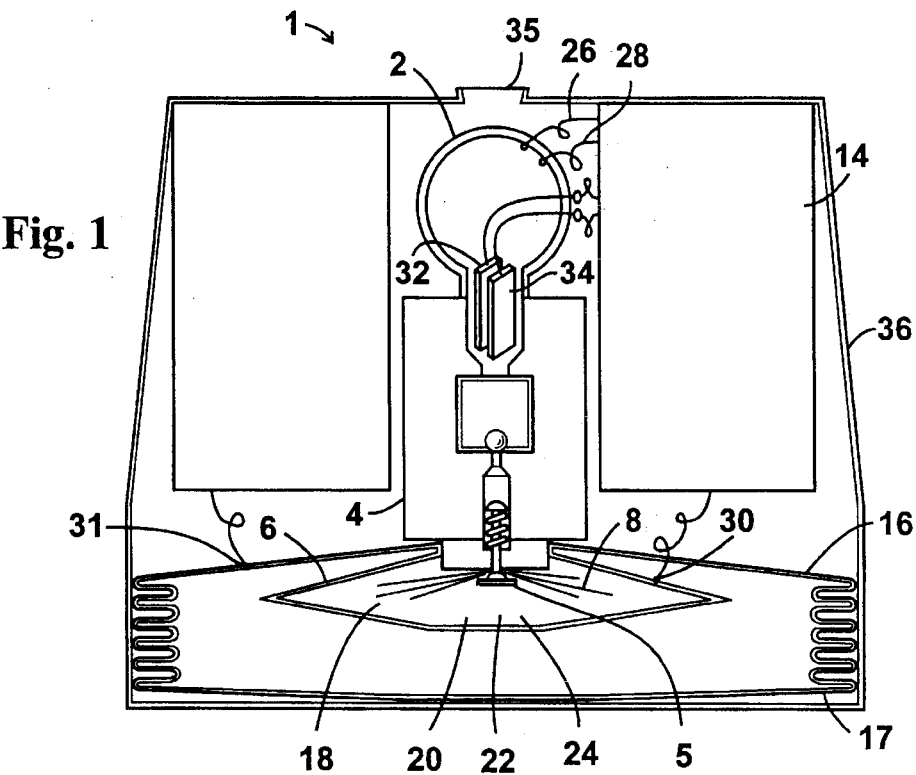
FIG. 1 is a schematic illustration showing components of the invention before deployment of an air bag.

FIG. 1 shows an air bag assembly 1 with chamber 2 for storing a suitable fluid such as an inventory of reagents selected from the group consisting of hydrogen, ammonia, methane, propane, butane, methanol, ethanol, air, nitrogen monoxide, nitrogen dioxide, oxygen, active metals, and water which are stored and delivered to combustion chamber 8 by valve assembly 4 which serves as a fuel valve and ignition system. Control of valve assembly 4 is provided by controller 14, preferably by an electrical impulse that is stored as a charged capacitor within 14. Ignition of fluid fuel emitting from valve 4 into a suitable oxidant stored in canister 8 is preferably by a spark, a suitable catalyst, or combination of spark and catalyst depending upon the size of the air bag, system cost, and desired shelf life. An electrical surge to create a suitable voltage for spark ignition is preferably stored in a battery, inductor, or capacitor within controller 14. This provides assurance of electrical energy for opening electrically operated valve 4 and production of spark energy in case of a collision that interrupts the vehicle's electrical system. Assured deployment of the air bag will occur as provided by the stored electricity within 14.

An initiating signal to deploy an air bag can be by an inertia switch within controller assembly 14 or by other signal generation from devices such as the seat belt actuator (not shown) that are located outside of 14.

Combustion of fuel delivered through valve 4 is preferably burned in zone 8 within excess air that is contained within chamber 6. Upon sufficient heating of the air in chamber 6, pressure develops to a magnitude to rupture canister 6 in preferred locations and air bag 16 is rapidly deployed by gases that escape from 6 and cause pressurization of the interior of bag 16. Canister 6 is preferably made from a low-modulus-of-elasticity thermoplastic such as polyethylene or polyester which is plated on the inside with aluminum and is provided with reduced thickness patterns for rupturing in a geometrical pattern that protects air bag 16 from damage due to overheating or impact with sharp edges and evenly distributes the hot gases to assure rapid deployment of air bag 36.

The embodiment of FIG. 1 overcomes many problems and limitations of previous approaches. It is preferred to store fuel and oxidant at high pressure in canisters that are contained within a fail-safe leak deflector bag 36 which has a preferred leak path 35 which deflects gases away from human locations that the air bag protects. At the time of deployment, protective bag 36 is interrupted by hoop expansion at the region of the folded bellows of bag 16 to provide desired inflation of 16 and protection of passengers. Fluid fuel such as hydrogen stored in chamber 2 may be mixed with fluids such as mixtures of calcium chloride and water or ethanol and water to provide a freeze-proof additive for the purposes of assisting in the sealing of chamber 8 against hydrogen leakage during long periods of storage and for replenishing the supply of hydrogen in case of slow leaks. Liquids that enter into capillaries and pores of the capillaries to provide sealing along with the ability to carry suitable rust and corrosion inhibitors assure long shelf life of gaseous fuel storage systems in instances that fuels such as hydrogen, carbon monoxide, methane, and ammonia are selected. Using liquid sealants and solutions for corrosion inhibition has been found to be one of several important improvements capable of solving the problem of storing small molecules at high pressure for long periods. Typical corrosion inhibitors include $NaNO_2$, $Na_2CrO_4$, and $Na_2MoO_4$ for ferritic alloys.

A particularly difficult problem with prior art systems is that an air-bag propellant such as hydrogen can leak or slowly react to the point that it is depleted and inadequate for purposes of rapid air-bag deployment. The present invention overcomes this problem by monitoring the storage temperature and pressure in chambers 2 and 6 by suitable sensors 26, 28, 30 and 31 to determine if the system is ready and capable of safe operation.

If the pressure of the propellant fuel drops below a prescribed limit in storage chamber 2 it may be restored by operation of electrolysis electrodes 32 and 34 to convert water stored in 2 or in an auxiliary canister to hydrogen. The electrochemical reaction of water and iron at one electrode produces iron hydroxide. At the other electrode, hydrogen is released to repressurize canister 2. At higher voltages, hydrogen and oxygen may be produced with provisions for the oxygen to be delivered either into storage in 6 or in 2 as desired. In addition to providing a safe and convenient manufacturing technique for loading 2 with hydrogen by releasing gaseous hydrogen from water stored in sealed chamber 2, the invention provides numerous fail-safe options which are controlled by 14. If pressure transducer 26 indicates inadequate pressure in 2 then a voltage is applied to electrodes 32 and 34 until sufficient hydrogen is produced to restore the desired pressure. Temperature and pressure in 2 are monitored to determine the leak rate and compared to a value held in memory for emergency alarm and repair purposes. This system may be programmed to generate a suitable warning, warning alarm, or interlock to prevent equipment operation until repairs are made.

Another function of fluid additives to the fuel stored in chamber 2 or to the oxidant stored in chamber 6 is to provide the option of diluting the hydrogen combustion with cooling ingredients for the purpose of reducing the peak temperature of the gases released by the air-bag inflation process. Typical dilutants include one or more of the following: nitrogen; water vapor; carbon dioxide; mixtures of alcohol and water; mixtures of baking soda, water and alcohol; mixtures of calcium, sodium or potassium chloride salts and water, acetic acid, argon, helium, ammonia, ammonium hydroxide, and excess air.

For larger air bags it is beneficial to store ammonia and/or hydrogen in chamber 2 along with a suitable fluid such as a solution of water, ethanol, and dilute acetic acid. Upon deployment this mixture of hydrogen and dilute acetic acid is combusted into a mixture of baking soda and air in canister 6. Water vapor, carbon dioxide and excess air at an acceptable temperature fill canister 6 until it ruptures and rapidly fills air bag 16 to provide protection for occupants of the vehicle equipped with the present invention. By rapidly combusting the hydrogen and acetic acid mixture within the confines of canister 6 in which the acetic acid is depleted within excess baking soda, it is assured that no acid escapes into air bag 16.

A safety bag inflation system that is especially adaptable for use in small or large bags provides an inventory of reagents selected from the group consisting of hydrogen, ammonia, methane, propane, butane, methanol, ethanol, air, nitrogen monoxide, nitrogen dioxide oxygen, active metals, and water which are stored in canister 2 and delivered through a suitable valve means 4 to a reaction distributor 5 where reaction of at least one of the reagents is initiated at 5 by techniques selected from the group consisting of catalytic material, spark discharge, shear orifices, and heated material. This system further includes a control circuit 14 for operation of valve 4. Pressure at a regulated value for the size of bag to be deployed is maintained in 2 by various techniques depending upon the size of bag to be inflated. These techniques include electrolysis, metal-acid reactions, metal-water reactions, metal-compound reactions, and catalytic dissociation. The selected technique is used to convert a portion of the reagents stored in 2 to gaseous constituents for the purpose of producing the desired storage pressure.

Hydrogen provides extremely rapid combustion. As shown in Table 1, hydrogen provides a rate of combustion that is many times greater than other fuel choices. This assures rapid completion of the desired reactions and inflation of air bag 16. Compact storage and rapid deployment by inflation of the air bag is assured in case of a vehicle collision, impending collision, or fire. To tailor the rate of inflation and amount of gas generated to inflate a protective bag, an inventory of reagents selected from the group consisting of hydrogen, ammonia, methane, propane, butane, methanol, ethanol, air, nitrogen monoxide, nitrogen dioxide oxygen, active metals and water which are stored in 2 and delivered through 4 to a reaction distributor 5 where at least some of the reagents from 2 are reacted with reagents contained within a second container 6. It is preferred to contain compressed air and dilutants in 6 however it is contemplated that compressed air and hydrogen containing compounds such as water, ammonia, or ammonium hydroxide would be contained in 2 and reactants such as hydrogen would be contained in 6. Initiation of the reaction between reagents may be by any suitable means including catalytic materials, spark discharge, shear orifices, and heated materials. Control of the pressure development and temperature of critical parts and surfaces is preferably provided by intermittent operation of valve 4 which may be a piezoelectric, electromagnetic, or pneumatic type.

Figure 2:
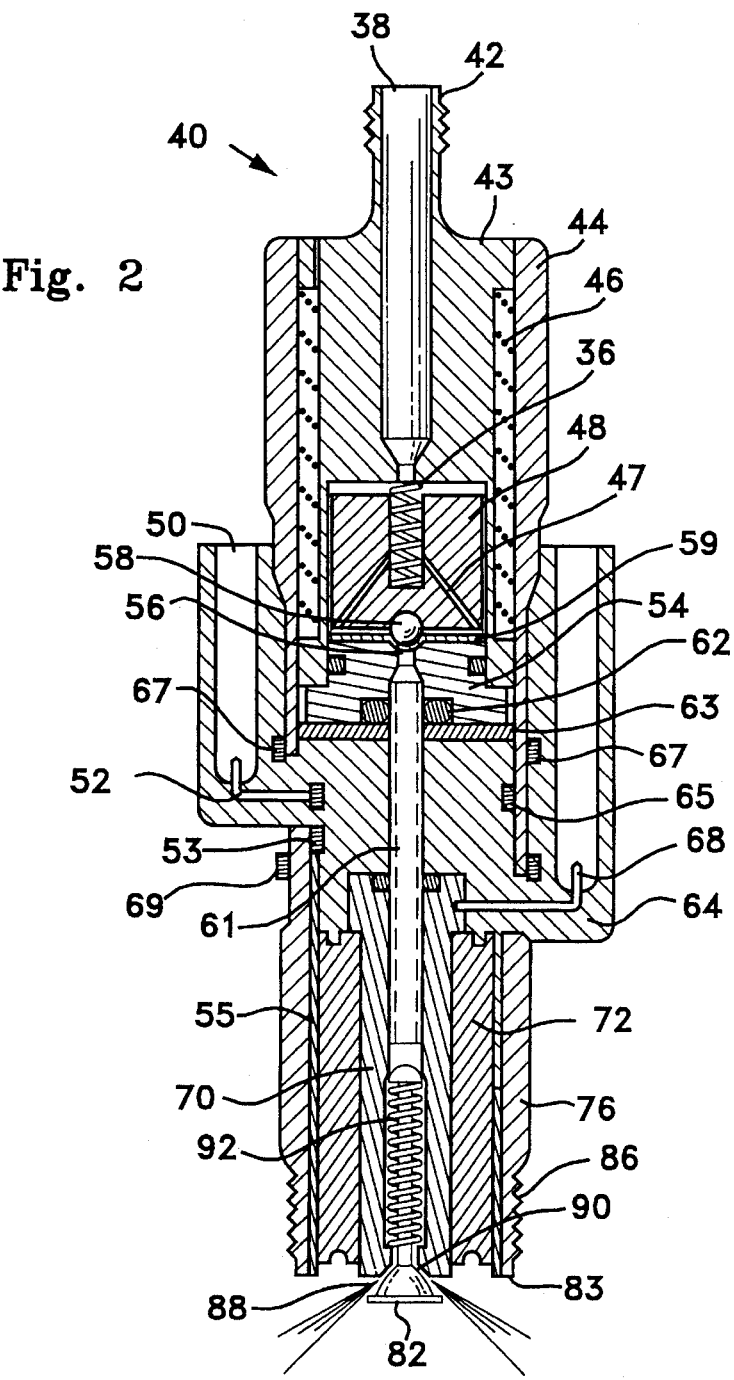
FIG. 2 is a longitudinal sectional view of a device constructed in accordance with the principles of the present invention for directly injecting and igniting fuel to form products of combustion for inflation of an air bag.

Control of the pressure in the air bag by intermittent operation of valve 4 is preferred in large-volume air bags. As shown in FIG. 2, polymer dielectric 64 transmits force to valve seat 54 as a result of pressure increases in 6 beyond dielectric 72. By providing a force or "pressure" transducer 63 between valve seat 54 and dielectric polymer 64, reagent reactions are monitored. Especially useful pressure transducers for this purpose are strain gages and piezoelectrics including ceramics such as quartz and barium titanate, and polymers such as polyvinylidene fluoride (PVDF). O-ring 62 in valve seat 54 can be made of such material to perform both sealing and pressure transducer functions. Deformation of the material produces a voltage signal that is be monitored to determine fluid pressure within the passage way from valve seat 54 to electrode nozzle 70. Axial force resulting from pressure variations in the reaction zone 8 is also indicated by piezoelectric o-ring 62 in valve seat 54. O-ring 62 may be molded in a strong electrostatic field to provide piezoelectric performance or treated after molding to produce piezoelectric effects.

Masking o-ring 62 and metallizing with conductive ink or by sputtering NiCu electrode patterns on the surface of the o-ring allows the voltage signal to be taken out of the assembly by a suitable electrical cable to an external controller. Electrode patterns can be designed to emphasize the signal for fuel pressure monitoring or to emphasize the signal for combustion chamber pressure monitoring or it can be designed to monitor both activities.

For monitoring the fuel pressure signal it is preferred to provide a metallized electrode around the greatest or outside diameter of the o-ring and to provide another opposing electrode at the smallest or inside diameter. The piezoelectric force signal is taken from the outside electrode to a controller outside of the injector 4. It is preferred to make valve seat 54 of a suitable dielectric material such as sintered alumina or other ceramic material however it has been possible to coat metal seats with powder-coated and sintered dielectrics such as perfluoroalkoxy polymer to produce a dielectric coating sufficient to electrically isolate the pressure transducer signal.

In instances that emphasized monitoring of combustion chamber pressures is desired it is preferred to mask the o-ring for application of opposing electrodes on the areas that contact the face of dielectric 64 and the parallel face of the o-ring groove in valve seat 54. This arrangement emphasizes voltage production between the electrodes for axial forces due to reaction pressures.

Another electrode pattern that has been found to be best for monitoring both reagent pressure in 2 or 104 and reaction pressure in 6 or 134 is provided by applying the electrodes about half-way between the two locations described above. This provides substantial signal for reagent-injection and reaction events.

Such piezoelectric material (PVDF) is also available in various thicknesses and dimensions from Pennwalt Corporation, Valley Forge, Pa. 19482. It has been found that a PVDF disc 63 having the outside diametrical dimension of the bore of case 76 at the location of valve seat 54, an inside bore dimension of the o-ring gland as shown, and a thickness of about 50 micrometers serves well as a reagent-pressure and reaction-chamber monitor. It is preferred to apply electrodes to the faces that contact valve seat 54 and dielectric 64. If valve seat 54 is metallic and grounded by contact to case 72, a single insulated lead to an outside controller suffices for monitoring the pressure events of interest.

In the instance that a piezoelectric disk 63 is used it is preferred to select the material for making dielectric body 64 with sufficient Poisson displacement from forces exerted by fuel pressure to develop a substantial axial force and resulting piezoelectric signal on transducer disc 63. In this instance it is preferred to select a relatively low modulus of elasticity material such as unfilled ethylene tetrafluoroethylene rather than a stiffer material such as glass-filled polyphenylene sulfide.

Another suitable form of piezoelectric sensor is a right circular cylinder such as 65, 67, or 69 located as shown in FIG. 2. Cylindrical piezoelectric transducers are available in outside diameters of 6.35 to 25.4 mm (0.25" to 1.00") with nominal wall thicknesses of 0.51 to 1.27 mm (.0.02"to 0.05") and in cylindrical lengths up to 300 mm or 12". Such devices can be special ordered from Atochem Sensors, P.O. Box 799, Valley Forge, Pa. 19482. Pressure transmitted from fuel passing through tubular space 61 and combustion-chamber pressure cycles cause piezoelectrics 65, 67, or 69 to generate electrical signals. Pressure rise and fall in the combustion chamber is transmitted through component assembly 55, 70, 72, and 64 to generate piezoelectric signals on transducers 62, 63, 65, 67 and 69. This allows monitoring the reagent storage conditions and reaction processes to determine operating conditions such as the temperature, pressure and stress caused by the inflation process. Determining the approach to allowable pressure and temperature conditions and the trend in heat escape as a result of reagent injection and reaction characteristics allows rapid optimization of air bag deployment. This approach to pressure measurement and characterization of reaction processes provides faster and much more comprehensive control and optimization of inflation processes than conventional approaches of weighing solid propellants.

In operation, force transducer 63, force-detecting o-ring 62, or transducers such as 65 are monitored by connection of their electrodes to a suitable electrical circuit for determining the occurrence of piezoelectric signals. Other suitable pressure transducers for determining the condition of stress, pressure, and temperature rise are served by the device of FIG. 9 include:

1. Fiber optic devices in which an interferometric cavity resonator is located between the end face of an optical fiber and a thin reflective silicon wafer chip. The chip acts as a diaphragm and flexes with differential pressure or with motion of surrounding materials that deform as a result of pressure within the reagent delivery conduit and due to pressure within the reaction chamber. This flexing of the diaphragm changes the cavity depth as a function of the diaphragm's radius and modifies the overall spectral reflectance of the light relative to the pressure. Any of four basic variables of intensity, frequency, phase, or polarization may be selected to sense pressure by this fiber optic instrumentation. Intensity modulation is a simple illustration in which the total intensity of reflected light indicates the pressure of the fuel conduit and the combustion chamber. A suitable source for such a device is Fiber Optic Sensor Technologies of Ann Arbor, Mich. See FIG. 2 regarding transparent material 55 as a fiber optic coupling arrangement to photoelectronic sensor 53.

2. Polysilicon piezoelectric gage elements bonded by chemical vapor deposition or molecular bond adhesion to a temperature matched substrate such as tube 61 of FIG. 2, or to the face of seat 54. Such devices are available from Rosemount, Inc. of Eden Prairie, Minn., and from Dresser/Ashcroft of Stanford, Conn.

3. Capacitance sensors with two-way transmitters using fiber optics, smart, or fieldbus communications. All versions use a microcapacitance silicon sensor. Such devices are available from Fuji Instruments, Ltd. of Tokyo, Japan. See FIG. 2 regarding 55 as a fiber optic coupling arrangement to photoelectronic sensor 53.

4. Ceramic diaphragms may be used in capacitance pressure sensors. Pressure sensors of this type are suitable and are available from Endress+Hauser Instruments of Greenwood, Ind.

5. Tuning fork instrumentation to determine pressure as a change of frequency is suitable and such pressure transducers measure the natural frequency with piezoelectric elements. Such devices are available from Yokogawa Corporation of America in Newman, Ga.

6. Fiber optic devices in which the intensity of reflected light is modified by a pressure deformable metallized mirror. The end of the fiber is fitted with a diaphragm having a reflective surface that acts as a variable reflector. The diaphragm flexes with differential pressure or with motion of surrounding materials that deform as a result of pressure within the fuel conduit and due to pressure within the combustion chamber. This flexing of the diaphragm changes the amount of reflected light as a function of the diaphragm's radius and modifies the overall spectral reflectance of the light relative to the pressure.

In operation, transducer 63 develops a signal in response to pressurize increases within the bore 61 as reagents passes to the reaction chamber.

A liquid such as 50% distilled water and 50% ethanol provides adequate freeze protection to about −34° C. (−37° F.). Another example of a solution that provides sealing of capillaries while providing freeze protection is a solution of 70% glycerol and 30% distilled water which crystallizes at about −39° C. (−38° F.). Still another solution for this purpose is ethylene glycol and water which provides a freezing temperature of about −39° C. (−38° F.) with a mixture of 50% distilled water. Additives for corrosion protection vary according to requirements posed by the materials used to construct various components of the fuel storage and combustion systems.

In the instance that metals such as aluminum or steel alloys are used for chamber 2 it is preferred to chemically react or heat treat the chamber to assure the presence of an oxide on the surfaces. In order to leak, the hydrogen must first diffuse through the metal oxide in order to enter the parent metal.

Hydrogen diffusion in metal oxides is either by diatomic hydrogen or hydroxyls (OH- or HOH). Hydroxyl diffusion is characterized in size and mass by oxygen. Because the bonding in metals is characterized by free electrons and because hydrogen is a metal, diffusion of hydrogen in metals may be by monatomic hydrogen or free-electron hydrogen ions. Hydrogen diffusion in metal oxides is generally more than three orders of magnitude slower than hydrogen diffusion in metals. Tenaciously bonded oxides such as $Al_2O_3$ on aluminum and chromium oxide on stainless steels are preferred coating examples.

Anodic coatings on aluminum or chemical coatings on aluminum are typically 100 to 1000 times thicker than the natural aluminum oxide. Anodized aluminum may be prepared by making the substrate aluminum the participant of an electrochemical cell in an acid electrolyte. Electrolytes such as sulfuric, oxalic, phosphoric and mixed acids can be used. $Al_2O_3$ coatings of 0.0127 mm (0.0005 inch) to 0.05 mm (0.002 inch) are prepared in this way. One problem with anodized coatings is that the aluminum oxide grown on the substrate is characterized as grain by grain structures with crevices between each grain.

These crevices are preferably sealed or closed by suitable chemical treatment including exposure to steam or boiling water to hydrate the aluminum oxide. Final assurance of sealing these grain-boundary crevices is by addition of water based solutions that wet these capillaries and block access to the metal substrate by hydrogen.

Hydrating the aluminum oxide at the surfaces of the crevices causes the grains of aluminum oxide to expand and seal the crevice interfaces. A number of nickel organics, including nickel acetate, are also useful for sealing aluminum oxide coatings. Prior to forming the compressively stressed aluminum hydrate, the anodized coatings can be stained by dyes to provide indication of uniformity and quality control. In instances that it is intended to store acids in canister 2 it is preferred to provide the protective measures stated along with a coating varnish such as those used to protect food storage cans that contain acidic foods. Examples of such coatings include conformal polythane, polyvinylidene chloride and polyvinylidene fluoride.

Preparation of oxide coatings as indicated provides a way for the net diffusion through an aluminum liner to be at least two orders of magnitude lower than the diffusion through a low-alloy steel liner. Stainless steel falls between these examples.

A difficult problem with storage of hydrogen is "cranny" corrosion due to depletion of oxygen from protective metal oxide coatings. Depletion of the protective oxide coating can be the result of elastic or plastic strain of metal substrates. Without the oxide film, most metals are highly reactive.

Maintaining integrity and continuity of the metal-oxide coating and conditioning the metal-oxide coating to produce compressive stresses provides an effective barrier to hydrogen entry to the substrate metal.

If the availability of oxygen to replace and repair metal-oxide coatings is depleted, the metal is susceptible to corrosion. Electrons pass through the metal to areas where the oxygen availability is greatest and this leaves metal ions in the exposed area free to enter into solution if an electrolyte is present. The electrolyte may be an invisible film of water that is acidic because of dissolved hydrogen.

Damage to stainless steels and other high-strength alloys in strained areas where the oxygen potential is not sufficient to cause immediate formation of protective layers is characterized by the following stress-corrosion process. The reaction provides hydrogen ions to enter the metal lattice and to make the water electrolytic:

$$4Fe^{++} + O_2 + 10H_2O \rightarrow 4Fe(OH)_3 + 8H^+ \quad \text{Equation 1}$$

Metal seals are generally designed to be deformed by mechanical stress until a line of contact produces the desired sealing effect. Next to the line of contact is a capillary for collection of moisture. A common complaint is that stainless steel seals are not "stainless" at and near the line of contact and under gaskets. Discoloration and pitting may result from depletion of protective chromium oxide coatings. Dark red, brown, or black stains reveal patterns of migration by iron ions into seal areas where the chromium oxide is depleted or broken and cannot be repaired because of oxygen deficiency.

Upon tear down and exposure to air during inspection, these iron ions rapidly oxidize to form colored oxides and reveal the extent of metal migration. Leaks develop because movement of metal ions leaves pathways through the seal for hydrogen to travel through.

As noted previously, the positive ion of hydrogen is a proton which is small enough in size to drift through the open spaces within the lattice of any metal. Electrostatic attraction for electrons deny any long-term duration of a proton in the presence of free electrons that exist in metallic lattices, so the proton quickly becomes a hydrogen atom. A hydrogen atom is also small enough to drift through most metal lattices. Atomic hydrogen so formed at a ferritic steel surface by reaction of the metal with an acid, even a weak acid such as hydrogen sulfide will diffuse through the metal, and collect in discontinuities in the ferrous lattice where the hydrogen atoms combine to form molecular hydrogen which can develop sufficient pressure to blister or crack the steel. This occurs at ordinary ambient temperatures.

Hot-rolled, low-carbon ferritic steels having alpha iron structures of body centered cubic lattices (BCC) are not embrittled by hydrogen at high pressures and temperatures below about 100° C. (212° F.). Ferritic steels are generally strengthened by alternating parallel layers of low carbon ductile steel and platelets of much stronger $Fe_3C$ which provide lattice discontinuities where hydrogen atoms may accumulate. Corrective measures for ferritic steels to be used with acids or electrolysis include the use of protective coatings to prevent corrosion of the steel and the use of steel plate processed and tested by procedures assuring freedom from irregular or severe lamination and other discontinuities where hydrogen can accumulate. In other words if there are enough discontinuities of more or less equal free energy and the amount of atomic hydrogen is limited the situation reaches equilibrium without blistering or cracking the steel.

However, hydrogen embrittlement of steel and other metals such as titanium alloys will occur at ambient temperatures on exposure to hydrogen gas at high pressures (2000 to 4000 atm) or in the presence of nascent hydrogen produced by electrolysis or chemical reactions. For purposes of compact storage it is desired to store hydrogen at pressures of 2000 to 4000 atmospheres. The embrittlement is produced by the effects of solution and diffusion of hydrogen on the crystal structures of the metals. At higher temperatures, about 400° F. or above, in addition to the embrittlement observed at lower temperatures, there occurs hydrogen attack, in which nascent hydrogen endothermically reacts with carbon in the steel to produce gaseous methane.

$$Fe_3C + 4H \rightarrow CH_4 + 3Fe \quad \text{Equation 2}$$

Methane molecules are much larger than nascent hydrogen and carbon in solid-solution and produce internal pressure. Accumulation of methane molecules greatly increases internal stress. Disappearance of the carbides and the formation of methane, which can develop high pressures, seriously weaken the alloy used to construct chamber 2. However, alloy steels containing such elements as chromium, tungsten, titanium, and vanadium, which form chemically stable intermetallic carbides with the carbon within the steel, are resistant to high-temperature hydrogen attack.

Several ways have been found adequate to prevent hydrogen from embrittling alloys that are strengthened by intermetallic discontinuities. One way is to add chemical constituents to the stored hydrogen that readily react with nascent hydrogen and thereby eliminate its presence. Nascent hydrogen "getters" such as oxygen, nitrous oxide, carbon monoxide, and water molecules serve in this capacity and either eliminate atomic hydrogen by chemical combination or by facilitating formation of diatomic hydrogen.

It should be noted that in the present application the presence of oxygen and/or oxygen donors has been found to be advantageous in preventing atomic hydrogen from degrading critical metal components. Another way to prevent entry of hydrogen into metal lattices is to coat the metal to be protected with a layer of getter material.

Protective metal oxides that will react with nascent hydrogen protect the metallic lattice from concerns regarding hydrogen. Hydroxyls may be formed by reaction of nascent hydrogen with oxygen from the protective oxide. Hydroxyls are much larger and more massive than nascent hydrogen and diffusion is greatly slowed. This provides compressive forces in the protective oxide film and strengthens the barrier against hydrogen escape. However, many metal oxides that normally form during popular forming and processing techniques are characterized by tendencies to be easily dislocated by mechanical or thermal motion. Such is the case of iron oxides that flake off as rust. Replacing rust with more tenacious layers such as an aluminum coating and the aluminum oxide that forms on the coating or chromium oxide that forms on stainless steels are examples of protective coatings. Aluminum coatings on steel protect against nascent hydrogen entry and embrittlement until the protective aluminum oxide coating is interrupted.

Figure 4:
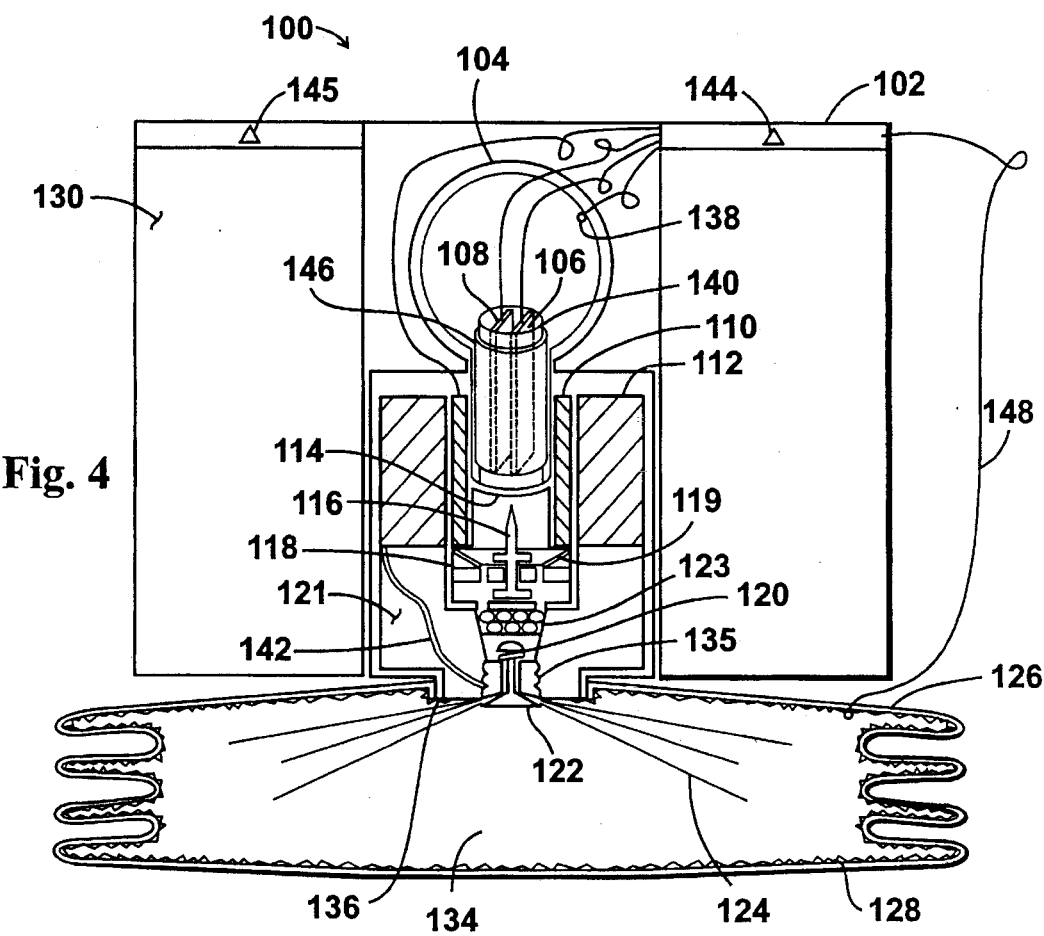
FIG. 4 is a schematic sectional view of a device constructed in accordance with the principles of the present invention for storing a fluid mixture of a fuel and oxidant, injecting the stored mixture and igniting the fluid mixture as it is injected into the interior of an air bag.

FIG. 4 shows the preferred embodiment of the invention for inflation of air bags that are larger than about 20 liters. As shown in FIG. 4, coatings 128 on the interior of air bag 126 and other interior parts with oxalic acid dihydrate (HOOCCOOH—$2H_2O$) in a suitable corrosion-inhibited aqueous gel such as those typical to shaving cream formulas provide protection against corrosion and overheating of internal components. Hot gases impinging upon this gel cause endothermic reactions in which carbon dioxide and water vapor are released to assist in the inflation of the air bag. Air bag assembly 100, consists of storage canister 104 which houses electrolysis electrodes 106 and 108, a controller circuit 102, a capacitor 130, solenoid winding 110, transformer winding 112, a hermetic-seal lance 116, hermetic seal 114, solenoid hammer disk 118, conical disk spring 119, nozzle assembly 135, combustion distributor 122, inflatable air bag 126, coating 128, and steam flame 124. Excess air 134 provides thermal insulation and expansion to provide rapid and safe inflation of air bag 126.

In operation, assembly 100 is actuated in case of a crash or fire by a suitable sensor such as impact sensor 144 or fire sensor 145 which causes controller 102 to initiate a current from a capacitor and/or inductor circuit 130 to solenoid coil 110 which serves as an electromagnet for hammer disk 118 and as a primary for transformer coil 112. Sensor 144 is preferably of the type that actuates seat belts. Sensor 145 is preferably of the ion detector or radiation sensor type that senses fires.

Hermetic-seal lance 116 is struck by hammer disk 118 to fracture hermetic seal 114. This arrangement allows a hermetically sealed hydrogen storage system to be rapidly ruptured for quick delivery to the air bag. The pressure against hermetic seal 114 causes it to rupture after being punctured and hydrogen and/or an oxidant expels 116 and flows around hammer disk 118 and through the holes shown into the passage shown in insulator 121 to conductive nozzle 135 to combustion distributor 122 and into the interior of 126.

Voltage builds in secondary coil 112 and is discharged at the time that hydrogen and oxidant flows through the gap between 122 and 136 created by displacement of 122 against the action of spring 120. It is preferred to utilize a multi-spark ignition circuit such as those supplied by Jacob Electronics at 500 Baird Street, Midland, Tex., or Mr. Gasket at 8700 Brookpark Road, Cleveland, Ohio, or MSD at 1490 Henry Brennan Dr., El Paso, Tex.

The included angle of the conical surface of 122 and its matching surface in may be varied as desired to control the pattern of hot gases emitted from 135. For larger air bags it is preferred to provide radial grooves in the concavo-conical surface of 135 to produce greater penetration of the propellant fluids into the air within 126. This results in faster inflation and more even distribution of hot gases within the air bag which is shown as a general bag 126 but which may be of any desired shape, pattern, and reticulated design.

Ignition of the hydrogen and oxidant is provided by spark discharge between 122 and 136 which have the same general configuration as components 82 and 83. Dielectric 121 insulates high voltage current from transformer coil 112 for delivery as shown to nozzle 135 and flame distributor 122. Hot gases rapidly heat air and protective layers 128 which release additional gases to inflate air bag 126.

Pressurization by electrolysis allows the selected electrolyte to be placed within membrane bag 140 and this unit to be sealed within 104. It is preferred to attach the bottom of a portion 140 to the bulkhead 114 to assure that 140 is ruptured at the time that 114 is ruptured by 116. It is also preferred to place 140 within a constraining tube 146 which is of sufficient strength to prevent 140 from filling the passage shown which connects 104 to bulkhead 114. This assures that the contents of 104 around 140 are allowed to pass through 114 at the time that it is ruptured.

Pressurization by electrolysis of water can efficiently produce essentially any desired storage pressure from room pressure water that is contained within 140 without requiring the use of a compressor. This method of pressurization greatly simplifies the manufacturing process for producing the subject invention. The packaged invention can be manufactured and remain in this low-pressure condition for a virtually infinite shelf life and then be pressurized by passing a current through the electrolyte to produce gaseous products which occupy more volume than the electrolyte.

Illustratively, at the time that the vehicle is to be put into service a current is passed through electrodes 106, the electrolyte, and 108 to produce hydrogen which pressurizes 140 and the surrounding interior gases such as air, nitrogen, argon and/or other gases in the remaining space within 104.

Sensor 138 monitors the pressure in storage canister 104. Controller 102 compares the pressure to an internal temperature compensated record that is kept to determine if pressure changes are due to temperature changes or loss of propellant inventory. Upon determination that leakage or slow reaction of the contents has depleted the propellant capability, additional hydrogen and oxygen are generated by electrolysis on electrodes 106 and 108. Electrodes 106 and 108 are of any suitable size and shape, however it is preferred to arrange these electrodes as concentric tubes with support by insulative members to prevent damage by vibration. Liquid water and an antifreeze additive such as potassium hydroxide or ethanol solution may be allowed to circulate freely within 104.

It is preferred however to keep the electrolyte solution in the space between electrodes 106 and 108 by a membrane envelope 140 or by incorporating the selected electrolyte as part of a gel that remains in place between electrodes 106 and 108. In operation, controller 102 applies a voltage to electrodes 106 and 108 through the connections shown.

Current flows through the hydrogen-containing electrolyte and creates hydrogen and oxygen which build pressure and restore the pressure to the desired magnitude within 104.

It is preferred to use a spin-formed seamless aluminum liner for chambers 2 and 104 which as been oxidized and treated with steam to prepare a tough uniform oxide coating. The liner is then wrapped with glass or carbon filaments that are impregnated with epoxy to form a tough impenetrable vessel with the metallic liner preloaded to be in a state of compressive stress that safely stores 60,000 psi hydrogen along with desired additives.

For very long shelf life requirements, thicker passive layers of tenaciously bonded protective oxide may be prepared by anodizing the liner and treating the freshly anodized oxide with steam. It is also possible to utilize austenitic stainless steels that are readily formed and fabricated and provide adherent protective oxide films.

Diaphragm 140 is preferably made from a low permeability thermoplastic such as a suitable polyolefin or polyester that is coated with a catalyst such as aluminum hydroxide to assure conversion of any nascent hydrogen to diatomic hydrogen or larger compound molecules. In instances that it is preferred to store hydrogen separately from the chosen oxidant, electrolytes such as solution of the halide salt of calcium, lithium, sodium, or potassium are preferred. Iron-alloy electrodes such as low-carbon steel and an aqueous solution of a suitable metal-halide salt such as NaCl, allow hydrogen to be generated by passage of a low voltage current from electrode 106 to 108 through electrolyte 109. Oxygen is combined with iron on one electrode to form iron hydroxide, precipitates containing oxygen, and other solvated compounds. Hydrogen is released on the other electrode as a diatomic gas which pressurizes the interior of 140 and thus the air or other fluids in 104 to the desired pressure.

Pressure, temperature, and current flow into 104 for hydrogen generation is monitored by 138 and compared by 102 to assure that the amount of hydrogen remains at a ratio that yields the desired hot gas temperature and volume upon actuation. This control is further facilitated by one or more strategically placed temperature and pressure probes 148 that allow controller 102 to cut off the supply of propellant fluids by allowing a suitable solenoid valve such as 48 from embodiment 40 as shown in FIG. 2 be located downstream of 118 and to close at the point that upper limits to the allowable temperature and/or pressure are approached. This may be followed by introduction of additional propellant by reopening 48 if needed to fully inflate the protective bag as desired and according to any number of predetermined routines for producing the best possible protection.

In applications requiring separation of hydrogen in 140 and oxidant in the surrounding area of 104 it is preferred to provide a pattern of machined or photoetched crevices in the down-stream face of 114 that allows rapid fracture and deformation of bulkhead flaps to release the contents of 140 and 104 into the air bag.

In the instance that the amount of hydrogen generated to maintain desired pressure within 104 approaches predetermined lower or upper limits, then an alarm or suitable interlock to prevent the use of protected equipment is actuated. In the instance that a metallic halide salt solution is utilized it is preferred to utilize a filter 123 that is preferably a steel-wool gauze plug impregnated with a suitable neutralizer such as sodium bicarbonate to neutralize any vapors of sulfur, sulfur oxides, or halide acids that may be formed in the electrolysis process. This results in release of carbon dioxide which helps in the dilution and desired temperature-reduction process for protecting the air bag from thermal damage.

It is preferred to cause fluids passing through and around 118 to be swirled into filter 123 for purposes of moving large particles around until they are subdivided sufficiently to pass through the filter, thus prolonging the dwell time and exposure path within filter 123 to complete the desired reactions. Fluid entry to filter 123 is through the asymmetric slanted holes as shown.

Another suitable method for generating hydrogen without releasing oxygen is by reaction of water with an active metal such as sodium, potassium, calcium, or lithium. In this instance, it is preferred to store such active metals in a protective glass envelope and to attach the envelope to thin bulkhead 114 for purposes of assuring that the protective glass envelope shatters at the time that 116 penetrates 114 to allow water contained within 104 to react with the active metal to form hydrogen. For smaller air bags it is preferred to store the amount of air, oxygen, nitrous oxide or other oxidant needed within 104. For larger air bags it is preferred to store additional oxidant in a down stream canister such as 6 as shown in FIG. 1.

For many applications under 3 liters in volume, a mixture of suitable fuel and oxidant are stored in 2 as shown in FIG. 1. In other applications it is preferred to separate fuel storage 2 and oxidant in combustion chamber 6 with valve 4 between them to prevent accidental deployment and to utilize excess air in 6 as a shock buffer along with the wall material of canister 6 as a sequential diffuser and distributor of heated gases between the primary combustion and the person being protected. This arrangement provides multiple layers of protection to assure safe and assured air bag deployment.

In larger air bag applications particularly where an asymmetrical shape is desired for the inflated bag, it is preferred to construct canister 6 from shaped components that have been formed from aluminum or aluminum coated thermoplastic. These components are preferably formed with blowout flaps 18, 20, 22, 24, etc., which allow safe escape and directed distribution of heated gases upon deployment to inflate air bag 16. The size and pattern of blow out flaps can be customized for any size and shape of air bag. Before attachment and being hermetically sealed to 4 as shown, a measured amount of liquid air is added to 6. Upon reaching ambient temperature this captured air becomes self pressurizing to the desired storage pressure. It is preferred to store air in 6 at a considerably lower pressure than the fluid fuel in 2 for the purpose of providing rapid delivery of fuel into the air within 6 when valve 4 is actuated.

FIG. 2 shows the preferred construction of the combination valve and ignition device 40 for inflating air bags up to about 20 liters in volume by suddenly combusting a fuel such as hydrogen in the presence of air in chamber 6. Fuel and additives carried along with the fuel are connected to fitting 42 which is part of solenoid body 43 within ferromagnetic housing 44. Fluid flows into valve 40 through solenoid valve poppet 48. When an electric current flows from controller 14 through insulated coil 46, solenoid poppet 48 is lifted from seat 54 to allow fluid to flow past seal 58 into conduit 60 of a suitable insulator tube and to spray nozzle 70. Fluid fuel flow from orifice 90 can be developed within 2 milliseconds of an actuation signal to controller 14. Coil 46 is preferably grounded to the vehicle ground system as is body 44 of valve 40. Suitable seals such as O-rings 62 are used to seal the fluid delivery path against leakage as shown.

Fuel fluids spray into air stored in chamber 6 as they pass through the orifice-seat between 88 and 90. Insulator materials 64 and 72 isolate lead 52 which is connected to pressure sensor 65 and high voltage lead 68 which is connected to electrode spray nozzle 70. It is preferred to use injection molded liquid crystal polyester resin for insulator body 64 which seals the space shown including formation of seal 78 with 72. Insulator body 72 is preferably a glazed porcelain similar to spark plug porcelain.

Spring 92 urges 88 close against seat 90 in 70 to cause the fuel fluid to be sprayed into chamber 6 as a thin sheet of finely atomized fuel. This helps the combustion to be nearly instantaneous upon reaching the oxidant following ignition. The rate of pressure development can be controlled, however, by limiting the rate at which fluid fuel is delivered through 38, 56, 60, and 90. It is preferred to provide a flow limiting orifice 56 for this purpose in metering seat 54 which is preferably made from a non-corrosive material such as sintered alumina or glass. This enables the manufacturer of the invention to choose the fuel storage pressure in chamber 2 for a small, medium or large air bag and to select a suitable orifice 56 for the rate of inflation needed.

In order to prevent corrosion, it is preferred to use an alumina ceramic or sapphire ball 58 to form a spherical seal against a plated metering body gasket 59. This film gasket 59 may be as copper, nickel or a polymeric such as polyclorotrifluoroethylene or polyvinylidene chloride. Ball 58 contacts and seals against plating 59 which covers the orifice of 56 to assure long-term stability and leak-free storage of fuel fluids in chamber 2. Orifice body 54 is made to size and plated or coated to form a film seal over a temporary mandril covering the bore of passage 56. This forms a continuous gasket film over the orifice of passage 56 which is assembled with ball 58 covering the orifice and seals against film 59 on the line contact area at the edge of the orifice of 56. This provides hermetic sealing of fuel fluids in 2 and up-stream of 59 until valve 4 is actuated and film 59 is broken. When poppet 48 along with captured ball 58 is lifted, it is preferred to pass the actuation current for solenoid 46 to ground through a circuit in membrane 54 which causes the portion of 54 covering 56 to heat and weaken sufficiently to rapidly fail when subjected to pressure on the full orifice area after lift off of 58. Fluid pressure blows open the gasket film covering the orifice of 56 and fuel fluids flow along the path shown to support combustion in 6 as shown in FIG. 1. Spring 36 urges 48 to remain closed and assures constant sealing until 48 is actuated.

In some vehicles it is preferred to incorporate a crash detection switch 144 such as an inertia switch within controller 14 or 102 and to maintain a charged capacitor of sufficient capacity to completely actuate the gas flows disclosed and resulting deployment of the protective bag. This overcomes the problems concerning conventional protective bags of roof, hood, or windshield impacts that may not induce air bag deployment along with failures to deploy due to accidental cut through or damage to battery connections.

Vehicles with side protection bags have the problem of impact from the side that does not set off the ordinary inertia switch and therefor leaves the occupant unprotected. The present invention overcomes this problem by incorporating all that is necessary for assured protection in case of fire, collision, or other hazard by incorporating appropriate sensors 144 and 145 for these conditions within or near the system. This feature of the present invention also solves the problem concerning large vehicles such as military or passenger aircraft may have the situation of needing selective air bag deployment to protect personnel in damaged areas without general deployment which would interfere with piloting or defending the aircraft.

Figure 3:
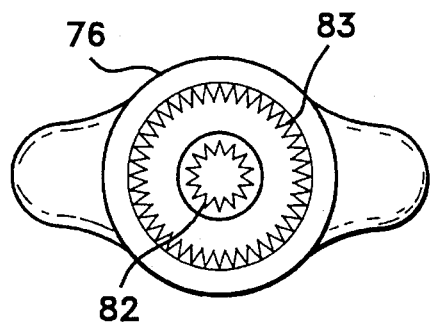
FIG. 3 is an end view of the device of FIG. 2 showing the location of ignition points.

Fuel ignition for larger air bags is preferably provided by catalysts such as platinum black or one or more sparks between 82 and 83 as shown in FIGS. 2 and 3. Ignition of fuel in smaller air bags is preferably provided by a suitable catalyst such as platinum black on points 82 and 83. Fuel ignition for extra large air bags may utilize a combination of catalyst and sparks. Attachment of 4 to canister 6 may be by any suitable means including spin welding or thread 86 and the interference seal shown in FIG. 2.

In instances that it the invention is installed for protection against fire, it is preferred to provide evaporative and or ablative coatings 17 to the outside surfaces of 16 in FIG. 1. It is preferred to use such coatings in combination with heat-absorbing coatings 128 as shown in FIG. 4. Upon being heated by a flame or other dangerous heat source these coatings prolong the protective function of a deployed bag by delaying thermal damage to 16. Suitable coatings include ceramics that puff and/or exfoliate upon being heated such as mixtures that contain mica, titania pearlite, and ceramic microspheres in a suitable paint vehicle such as polyvinylidene chloride or water-based acrylic.

It thus will be understood that the objects of this invention have been fully and effectively accomplished. It will be realized, however that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

TABLE 1

FUEL COMBUSTION CHARACTERISTICS

| FUEL | LOWER FLAME LIMIT | UPPER FLAME LIMIT | LOWER HEAT RELEASE (BTU/lb) | HIGHER HEAT RELEASE (BTU/lb) | AIR-FUEL RATIO | FLAME SPEED* (Ft/Sec.) |
|---|---|---|---|---|---|---|
| HYDROGEN | 4% VOL. | 75% VOL. | 51,593 | 61,031 | 34.5 LBS/LB | 30,200 |
| CARBON MONOXIDE | 12 | 74.2 | 4,347 | 4,347 | 2.85 | |
| METHANE | 5.3 | 15 | 21,518 | 23,890 | 17.21 | 4,025 |
| ETHANE | 3 | 12.5 | 20,432 | 22,100 | 16.14 | 4,040 |
| PROPANE | 2.1 | 9.4 | 19,944 | 21,670 | 15.65 | 4,050 |
| BUTANE | 1.8 | 8.4 | 19,679 | 21,316 | 15.44 | 4,060 |
| BENZENE | 1.4 | 7.1 | 17,466 | 18,188 | 13.26 | 4,150 |
| METHANOL | 6.7 | 36.5 | 7,658 | 9.758 | 6.46 | 3,900 |

TABLE 1-continued

| | FUEL COMBUSTION CHARACTERISTICS | | | | | |
|---|---|---|---|---|---|---|
| FUEL | LOWER FLAME LIMIT | UPPER FLAME LIMIT | LOWER HEAT RELEASE (BTU/lb) | HIGHER HEAT RELEASE (BTU/lb) | AIR-FUEL RATIO | FLAME SPEED* (Ft/Sec.) |
| ETHANOL | 3.2 | 19 | 9,620 | 12,770 | 8.99 | 4,030 |
| OCTANE | | | 19,029 | 20,529 | 15.11 | 4,280 |
| HEXANE | 1.18 | 7.4 | | | | 4,200 |
| GASOLINE | 1.0 | 7.6 | 18,900 | 20,380 | 14.9 | 4,010 |

*At Atmospheric Pressure

What is claimed is:

1. A safety bag system for compact storage and rapid deployment by inflation in case of an emergency said system including:

an inflatable bag means;

wherein at the time of manufacture of said safety bag system a relatively inert inventory of substances are loaded into a suitable storage means, and at suitable times after manufacturing said safety bag system a means for producing a fuel from said relatively inert inventory of substances is employed to an extent sufficient to provide and maintain the desired quantity of said fuel, and upon an emergency condition selected from the group including fire and collision a suitable means is employed to initiate reaction of said fuel to inflate said inflatable bag means.

2. A safety bag system as in claim 1 wherein said valve means is actuated by means selected from the group including piezoelectric actuation, electromagnetic actuation, pneumatic actuation.

3. A safety bag system as in claim 1 wherein said valve means is actuated by a control means in timed intervals selected from the group including: once, intermittently, and occasionally to produce desired conditions as detected by suitable sensor means wherein said valve means is actuated by means selected from the group including piezoelectric actuation, electromagnetic actuation, and pneumatic function; and wherein sensor means selected from the group including pressure sensors, temperature sensors, and strain sensors for detecting the conditions selected from the group including the fluids within the inflatable bag, coatings on the surface of the bag, components of said valve means, and the material of the inflatable bag; are monitored for operation of said control means for optimization of a result selected from the group including the pressure, temperature, and stress of said system in response to said sensor means.

4. A safety bag system as in claim 1 wherein said fuel is substantially generated by passage of an electrical current through a compound that contains hydrogen.

5. A system as in claim 1 including coating means selected from the group including materials that provide functional participation upon being heated to release gaseous constituents selected from the group including carbon dioxide, nitrogen, water vapor, and inert gases; and materials that provide functional participation by reacting with objectionable constituents found in said first fluid material or materials produced by reaction of first said material to produce less harmful products; wherein said coating means is applied to selected surfaces within said inflatable bag means.

6. Apparatus for supplying expansive fluids to an inflatable bag comprising: means for storing a first reactant, means for storing a second reactant, a valve means separating said storing means, said last mentioned means providing an ignition means substantially in the region of mixing said first reactant with said second reactant wherein said ignition means is selected from the group including hot-surface ignition, shear orifices, catalytic ignition, and spark discharge.

7. Apparatus as specified in claim 6 wherein said spark discharge is provided between surfaces that shape the flow of said expansive fluid.

8. Apparatus as in claim 6 including coatings selected from the group including materials that provide functional participation upon being heated to release gaseous constituents selected from the group including carbon dioxide, nitrogen, water vapor, and inert gases; and materials that provide functional participation by reacting with objectionable constituents found in said first reactant, said second reactant or the products produced by reaction involving said reactants to produce less harmful products where in said coatings are applied to selected surfaces within said apparatus.

9. Apparatus as in claim 6 in which actuation of said apparatus is provided in response to signals produced by instrumentation means selected from the group including sensors for detecting fire, sensors for detecting collision; sensors for detecting impending collision.

10. A combined fluid supply conduit and ignition apparatus adapted to be received in an opening to an air bag, said apparatus comprising a tubular member adapted to form a pressure holding seal with said opening, and providing a passageway for fluid to enter said air bag, a generally centrally disposed electrode extending from said passageway into said air bag when said apparatus is located in said opening, valve means to open or close said passageway to control flow of fluid therethrough into said electrode, said electrode when actuated initiates a reaction by means selected from the group consisting of spark discharge, hot surface, and catalytic action wherein said reaction involves substantial amounts of said fluid.

11. An apparatus as in claim 10 wherein said valve means is actuated by means selected from the group consisting of piezoelectric, solenoid, hydraulic, and pneumatic operation.

12. An apparatus as in claim 10 wherein said valve means is initially sealed by a hermetic membrane that is interrupted by a means selected from the group consisting of weakening of the membrane by resistance heating, impact shattering of the membrane, and puncturing the membrane by a sharp object.

* * * * *